United States Patent
Suzuki et al.

(10) Patent No.: US 10,223,054 B2
(45) Date of Patent: Mar. 5, 2019

(54) COMMUNICATION DEVICE AND NON-TRANSITORY COMPUTER-READABLE MEDIUM FOR TERMINAL DEVICE

(71) Applicant: Brother Kogyo Kabushiki Kaisha, Nagoya-shi, Aichi-ken (JP)

(72) Inventors: Satoshi Suzuki, Nagoya (JP); Hirotaka Asakura, Nagoya (JP); Yusuke Shimada, Owariasahi (JP); Hiroshi Shibata, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/899,027

(22) Filed: Feb. 19, 2018

(65) Prior Publication Data
US 2018/0239572 A1    Aug. 23, 2018

(30) Foreign Application Priority Data
Feb. 21, 2017   (JP) ................. 2017-030267

(51) Int. Cl.
*H04M 1/725*   (2006.01)
*G06F 3/12*    (2006.01)
(Continued)

(52) U.S. Cl.
CPC ............ *G06F 3/1292* (2013.01); *H04W 4/80* (2018.02); *H04W 92/16* (2013.01); *H04W 12/06* (2013.01); *H04W 84/12* (2013.01); *H04W 88/08* (2013.01)

(58) Field of Classification Search
CPC ....... H04W 4/80; H04W 84/12; H04W 88/06; H04W 88/08; H04M 1/7253; H04N 2201/0094
(Continued)

(56) References Cited

U.S. PATENT DOCUMENTS 8,340,577 B2 * 12/2012 Griffin ................. H04B 5/0062
                                                    455/41.2
9,832,302 B2 * 11/2017 Takeuchi ............ H04M 1/7253
(Continued)

FOREIGN PATENT DOCUMENTS

JP     2017-017601 A    1/2017

OTHER PUBLICATIONS

Wi-Fi Alliance Technical Committee P2P Task Group, "Wi-Fi Peer-to Peer (P2P) Technical Specication", Version 1.1, pp. 1-159, 2010.

*Primary Examiner* — Quochien B Vuong
(74) *Attorney, Agent, or Firm* — Banner & Witcoff, Ltd.

(57) ABSTRACT

A communication device may, in response to a wireless link via the first wireless interface being established with a terminal device while the communication device is a parent station state, receive a predetermined signal from the terminal device via the second wireless interface. If the predetermined signal is received from the terminal device, shifting communication device from the parent station state to a specific state where the communication device does not operate as a parent station. The communication device is maintained in the parent station state if the predetermined signal is not received from the terminal device even if the wireless link via the first wireless interface has been established with the terminal device. After shifting the communication device to the specific state, establishing a first wireless connection via the second wireless interface with the terminal device so as to participate in a second wireless network as a child station.

17 Claims, 3 Drawing Sheets

(51) Int. Cl.
*H04W 4/80* (2018.01)
*H04W 92/16* (2009.01)
*H04W 84/12* (2009.01)
*H04W 88/08* (2009.01)
*H04W 12/06* (2009.01)

(58) Field of Classification Search
USPC .................................. 455/41.1, 41.2, 41.3
See application file for complete search history.

(56) References Cited

U.S. PATENT DOCUMENTS

| | | | |
|---|---|---|---|
| 2007/0037610 A1* | 2/2007 | Logan | H04M 1/72563 455/574 |
| 2016/0081019 A1* | 3/2016 | Pujari | H04W 52/0209 370/311 |
| 2017/0005876 A1 | 1/2017 | Shibata | |

* cited by examiner

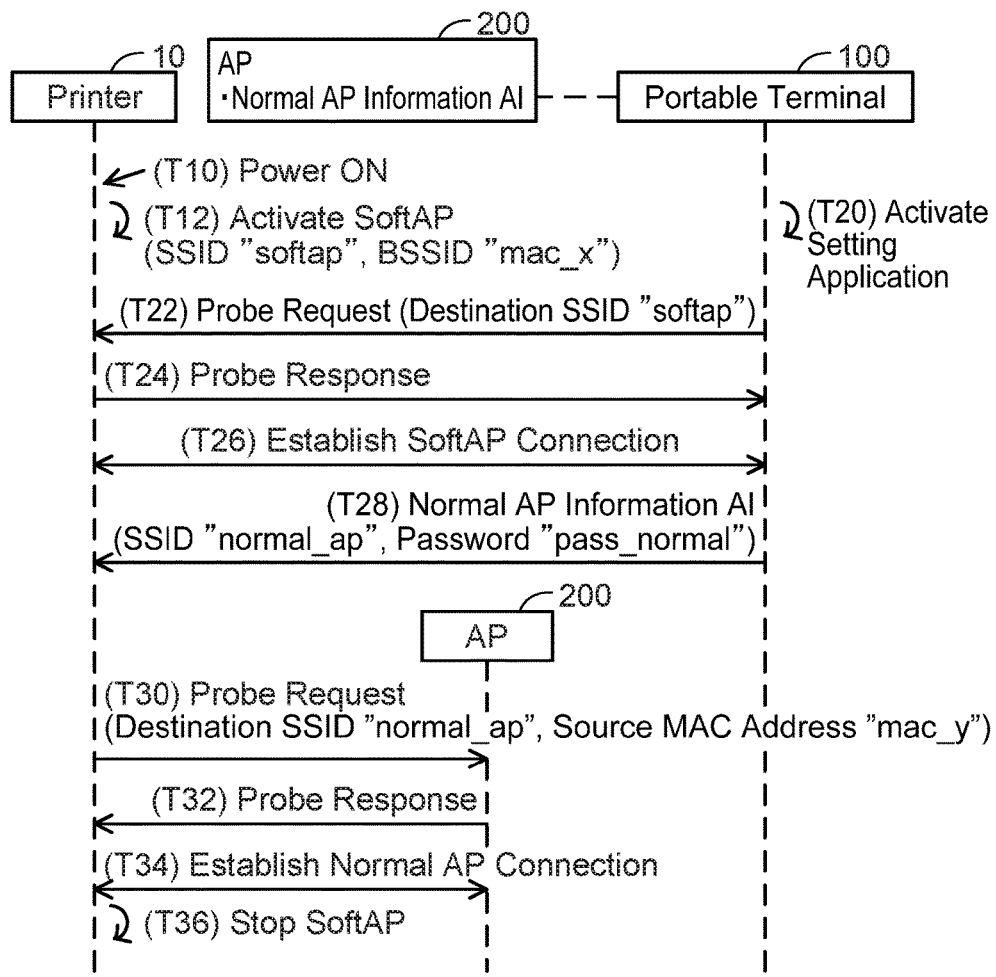

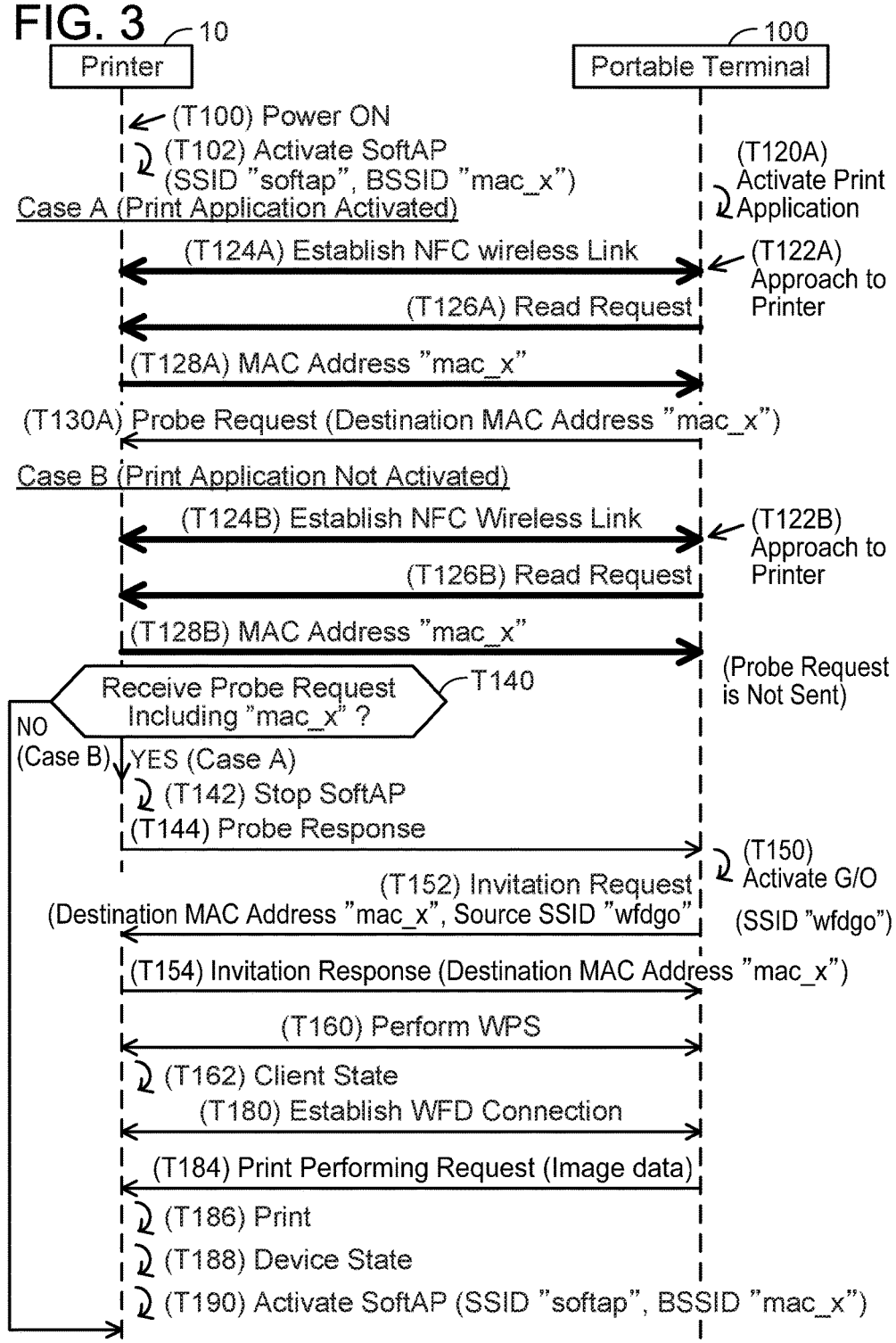

COMMUNICATION DEVICE AND NON-TRANSITORY COMPUTER-READABLE MEDIUM FOR TERMINAL DEVICE

TECHNICAL FIELD

The present disclosure discloses a communication device capable of operating as a parent station and a child station of a wireless network, and a non-transitory computer-readable medium storing computer-readable instructions for a terminal device capable of establishing a wireless connection with the communication device.

DESCRIPTION OF RELATED ART

Various techniques for forming a wireless network by a communication device are known. For example, a communication device supporting a so-called SoftAP function can activate a SoftAP and operate as a parent station of a wireless network. In addition, a communication device supporting a WFD (abbreviation of Wi-Fi Direct (registered trademark)) scheme formulated by the Wi-Fi Alliance can shift to a G/O (abbreviation of Group Owner) state according to the WFD scheme to operate as a parent station of a wireless network. While operating as a parent station of a wireless network, the communication device can establish a wireless connection with another device and cause the device to participate in the wireless network as a child station.

SUMMARY

For example, a situation is conceivable where a communication device operates as a parent station of a wireless network for a certain purpose. In this case, for example, when a terminal device participates in the wireless network as a child station in order to achieve a purpose that differs from the certain purpose, the communication device may not be able to appropriately achieve the different purpose. The present disclosure provides a communication device that may appropriately achieve a purpose desired by a terminal device.

A communication device disclosed herein may comprise: a first wireless interface; a second wireless interface being different from the first wireless interface; a processor; and a memory configured to store computer-readable instructions therein, the computer-readable instructions, when executed by the processor, causing the communication device to: in response to a wireless link via the first wireless interface being established with a terminal device while a state of the communication device is a parent station state where the communication device operates as a parent station of a first wireless network, receive a predetermined signal from the terminal device via the second wireless interface, the first wireless network being a network for performing a wireless communication via the second wireless interface; in a case where the predetermined signal is received from the terminal device, shift the state of the communication device from the parent station state to a specific state where the communication device does not operate as the parent station of the first wireless network, wherein the state of the communication device is maintained in the parent station state in a case where the predetermined signal is not received from the terminal device even if the wireless link via the first wireless interface has been established with the terminal device while the state of the communication device is the parent station state; and after the state of the communication device has been shifted from the parent station state to the specific state, establish a first wireless connection via the second wireless interface with the terminal device so as to participate in a second wireless network as a child station, the second wireless network being a wireless network in which the terminal device operates as a parent station.

A non-transitory computer-readable medium storing computer-readable instructions for a terminal device is further disclosed herein. The computer-readable instructions, when executed by a processor of the terminal device, may cause the terminal device to; in response to a wireless link via a first wireless interface of the terminal device being established with a communication device while a state of the communication device is a first parent station state where the communication device operates as a parent station of a first wireless network, send a predetermined signal to the communication device via a second wireless interface of the terminal device, the predetermined signal being for shifting the state of the communication device from the first parent station state to a specific state where the communication device does not operate as the parent station of the first wireless network; shift a state of the terminal device from a non-parent station state to a second parent station state, the non-parent station state being a state where the terminal device does not operate as a parent station of a wireless network, the second parent station state being a state where the terminal, device operates as a parent station of a second wireless network, the second wireless network being a network for performing a wireless communication via the second wireless interface; and after the state of the communication device has been shifted from the parent station state to the specific state, establish a first wireless connection via the second wireless interface with the communication device so as to cause the communication device to participate in the second wireless network as a child station.

A control method and computer-readable instructions for implementation of the communication device described above, and a non-transitory computer-readable recording medium in which the computer-readable instructions are stored, are also novel and useful. The terminal device itself and a control method for implementation of the terminal device are also novel and useful.

BRIEF DESCRIPTION OF THE DRAWINGS

FIG. 2 shows a sequence diagram of a case where a printer establishes a wireless connection with an access point;
FIG. 3 shows a sequence diagram of a case where the printer establishes a wireless connection according to the WFD scheme with a portable terminal.

EMBODIMENT

Figure 1:
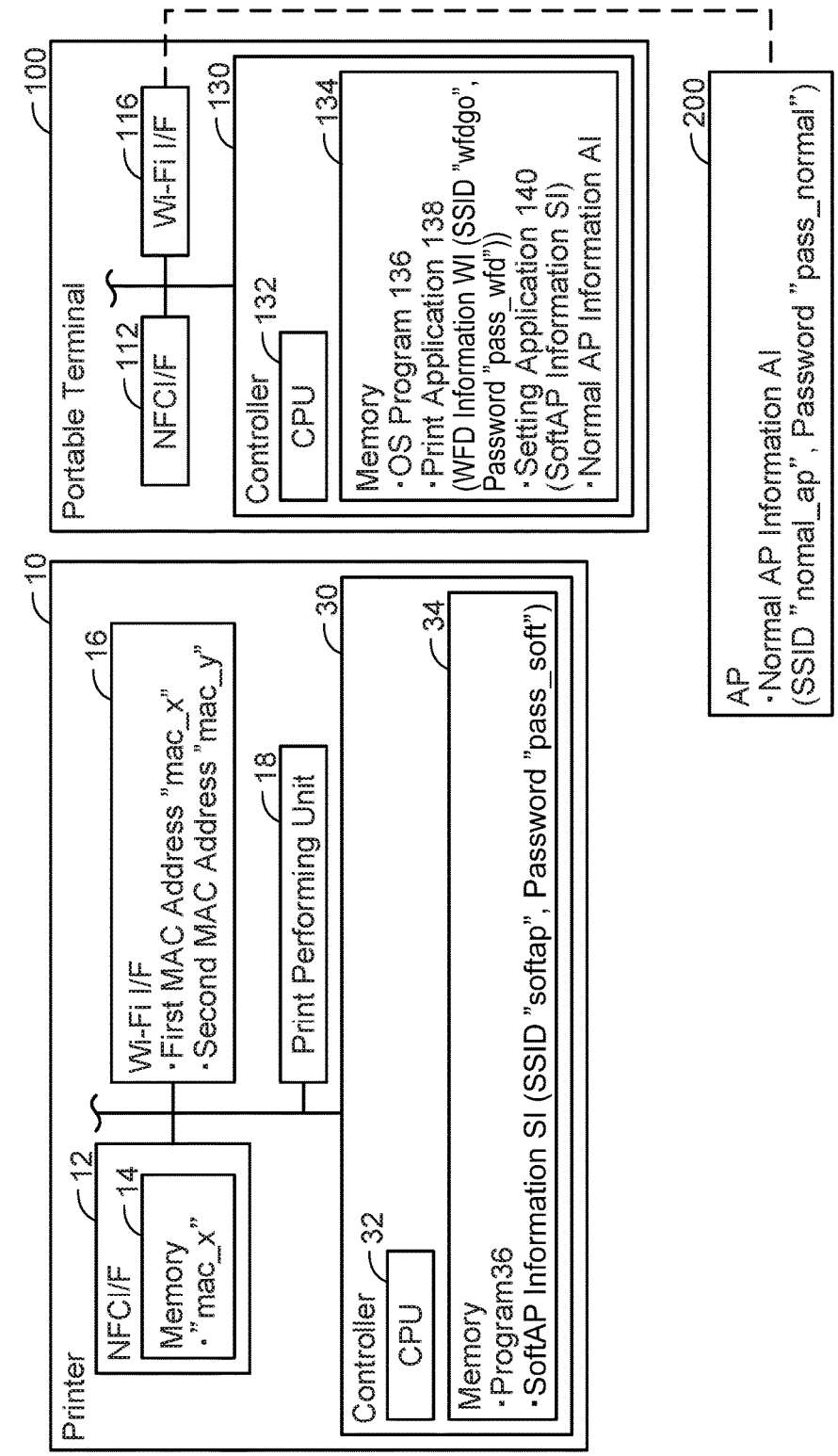
FIG. 1 shows a configuration of a communication system.

First Embodiment
(Configuration of Communication System 2: FIG. 1)
As shown in FIG. 1, a communication system 2 includes a printer 10, a portable terminal 100, and an access point 200. Hereinafter, the access point 200 will be referred to as an AP (abbreviation of Access Point) 200.
(Configuration of Printer 10: FIG. 1)
The printer 10 is a peripheral device (i.e., a peripheral device of the portable terminal 100 and the like) capable of performing a print function. The printer 10 includes an NFC interface 12, a Wi-Fi interface 16, a print performing unit 18, and a controller 30. Hereinafter, an interface will be referred to as an "I/F".

The NFC I/F 12 is an I/F for performing a wireless communication according to an NFC scheme. The NFC scheme is a wireless communication scheme based on, for example, an international standard such as ISO/IEC 21481 or ISO/IEC 18092. The NFC I/F 12 includes a memory 14. The memory 14 stores a first MAC address "mac_x" assigned to the Wi-Fi I/F 16. The first MAC address "mac_x" is stored in the memory 14 when power of the printer 10 is turned on. The NFC I/F 12 is an NFC tag. It should be noted, in a modification, the NFC I/F 12 may be an NFC forum device.

The Wi-Fi I/F 16 is an I/F for performing a wireless communication according to a Wi-Fi scheme. The Wi-Fi scheme is a wireless communication scheme which conforms to a standard formulated by the Wi-Fi Alliance and which is based on, for example, the standard of the IEEE (abbreviation of The Institute of Electrical and Electronics Engineers, Inc.) 802.11 and standards conforming thereto (for example, 802.11a, 11b, 11g, and 11n). In particular, the Wi-Fi I/F 16 supports a SoftAP (abbreviation of Software Access Point) scheme. The Wi-Fi I/F 16 further supports a WFD (abbreviation of Wi-Fi Direct (registered trademark)) scheme. Details of the WFD scheme are described in written standards "Wi-Fi Peer-to-Peer (P2P) Technical Specification Version 1.1" created by the Wi-Fi Alliance.

Physically, the Wi-Fi I/F 16 is a single interface. However, the I/F 16 is assigned with the first MAC address "mac_x" for performing both a wireless communication according to the SoftAP scheme and a wireless communication according to the WFD scheme, and a second MAC address "mac_y" for performing a wireless communication according to a normal Wi-Fi scheme. The normal Wi-Fi scheme is a scheme for performing a wireless communication with the AP 200.

The Wi-Fi I/F 16 can perform a wireless communication according to, for example, the WFD scheme with the portable terminal 100 using the first MAC address "mac_x", while performing a wireless communication according to the normal Wi-Fi scheme with the AP 200 using the second MAC address "mac_y". The first MAC address "mac_x" is used for both a wireless communication according to the SoftAP scheme and a wireless communication according to the WFD scheme. Therefore, the Wi-Fi I/F 16 cannot simultaneously perform a wireless communication according to the SoftAP scheme and a wireless communication according to the WFD scheme. However, in a modification, a third MAC address may be further assigned to the Wi-Fi I/F 16. In other words, the Wi-Fi I/F 16 may be capable of simultaneously performing a wireless communication according to the SoftAP scheme and a wireless communication according to the WFD scheme.

In addition, the Wi-Fi I/F 16 supports WPS (abbreviation of Wi-Fi Protected Setup) formulated by the Wi-Fi Alliance. The WPS is what is commonly known as an automatic wireless setup or a simple wireless setup, and is a technique that enables a wireless connection according to the Wi-Fi scheme to be easily established between a pair of devices even when information for establishing a wireless connection according to the Wi-Fi scheme (such as an SSID (abbreviation of Service Set Identifier), a password, an authentication scheme, and an encryption scheme) is not inputted by a user.

Here, differences between the NFC I/F 12 and the Wi-Fi I/F 16 will now be described. A communication speed of a wireless communication via the Wi-Fi I/F 16 (for example, a maximum communication speed of 11 to 600 Mbps) is faster than a communication speed of a wireless communication via the NFC I/F 12 (for example, a maximum communication speed of 100 to 424 Kbps). In addition, a frequency of a carrier wave in a wireless communication via the Wi-Fi I/F 16 (for example, 2.4 GHz band or 5.0 GHz band) is different from a frequency of a carrier wave in a wireless communication via the NFC I/F 12 (for example, 13.56 MHz band). Furthermore, a maximum distance with which a wireless communication via the Wi-Fi I/F 16 can be performed (for example, a maximum distance of approximately 100 m) is greater than a maximum distance with which a wireless communication via the NFC I/F 12 can be performed (for example, a maximum distance of approximately 10 cm).

The controller 30 includes a CPU 32 and a memory 34. The CPU 32 performs various processes in accordance with a program 36 in the memory 34. The memory 34 is constituted of a ROM, a RAM, or the like. In addition to the program 36, the memory 34 also stores SoftAP information SI.

The SoftAP information SI is wireless setting information used in a wireless network that is formed by the printer 10 operating as a SoftAP (hereinafter, referred to as "SoftAPNW"). While operating as the parent station of the SoftAPNW (in other words, as the SoftAP), the printer 10 can establish a wireless connection (hereinafter, referred to as "SoftAP connection") with, for example, the portable terminal 100 using the SoftAP information SI, and cause the portable terminal 100 to participate in the SoftAPNW as a child station. The SoftAP information SI includes an SSID "softap" and a password "pass_soft". The SSID is an identifier for identifying a wireless network. The password is information used for authentication and encryption in a wireless network. The SoftAP information SI is stored in advance in the memory 34 prior to the shipment of the printer 10 in the present embodiment, however, in a modification, the SoftAP information SI may be installed to the memory 34, for example, from a server on the Internet after the shipment of the printer 10.

(Configuration of Portable Terminal 100: FIG. 1)

The portable terminal 100 is a portable terminal device such as a portable phone (for example, a smartphone), a PDA, and a tablet terminal. The portable terminal 100 includes an NFC I/F 112, a Wi-Fi I/F 116, and a controller 130. The NFC I/F 112 is an I/F for performing a wireless communication according to the NFC scheme. The NFC I/F 112 is an NFC forum device. The Wi-Fi I/F 116 is an I/F for performing a wireless communication according to the Wi-Fi scheme.

The controller 130 includes a CPU 132 and a memory 134. The CPU 132 performs various processes in accordance with an OS (abbreviation of Operating System) program 136 in the memory 134. In the state shown in FIG. 1, the portable terminal 100 has established a wireless connection with the AP 200 (hereinafter, referred as "normal AP connection") via the Wi-Fi I/F 116, and is participating as a child station in a wireless network formed by the AP 200 (hereinafter, referred to as "normal APNW"). The memory 134 stores normal AP information AI that is wireless setting information used in the normal APNW. The normal AP information AI includes an SSID "normal_ap" and a password "pass_normal". The SSID "normal_ap" and the password "pass_normal" are respectively different from the SSID and the password included in the SoftAP information SI.

The memory 134 further stores a print application 138 and a setting application 140. The respective applications 138 and 140 are provided by a vendor of the printer 10. The portable terminal 100 may install the respective applications 138 and 140, for example, from a medium shipped together with the printer 10, or may install the respective applications 138 and 140 from a server (not illustrated) on the Internet.

The print application 138 is an application for causing the printer 10 to perform printing. WFD information WI is described in advance in the print application 138. The WFD information WI is wireless setting information used in a wireless network that is formed by the portable terminal 100 operating as a G/O of the WFD scheme (hereinafter, referred to as "WFDNW"). While operating as the parent station (in other words, as the G/O) of the WFDNW, the portable terminal 100 can establish a wireless connection (hereinafter, referred to as "WFD connection") using the WFD information WI with, for example, the printer 10, and cause the printer 10 to participate in the WFDNW as a child station. The WFD information WI includes an SSID "wfdgo" and a password "pass_wfd". The SSID "wfdgo" and the password "pass_wfd" are respectively different from the SSIDs and the passwords included in the SoftAP information SI and the normal AP information AI. The WFD information WI is described in advance in the print application 138 in the present embodiment, however, in a modification, the WFD information WI may be generated by the CPU 132 and stored in the memory 134 at a predetermined timing in activation of the print application 138.

The setting application 140 is an application for sending the normal AP information AI in the memory 134 to the printer 10, and causing the printer 10 to participate in the normal APNW as a child station. The SoftAP inflammation SI is described in advance in the setting application 140.

The SoftAPNW in which the printer 10 operates as the parent station (in other words, as the SoftAP) and the WFDNW in which the portable terminal 100 operates as the parent station (in other words, as the G/O) are used to achieve purposes that are different from each other. For example, the SoftAPNW is used to achieve a purpose of the printer 10 acquiring the normal AP information AI from the portable terminal 100. The WFDNW is used to achieve a purpose of the portable terminal 100 causing the printer 10 to perform printing.

(Configuration of AP 200: FIG. 1)

The AP 200 is a known AP called a wireless AP, a wireless LAN router, and the like. The AP 200 has established a normal APNW in which the normal AP information AI (in other words, the SSID "normal_ap" and the password "pass_normal") is used, and in the state shown in FIG. 1, the AP 200 has established the normal AP connection with the portable terminal 100.

(Process by which Printer 10 Establishes Normal AP Connection: FIG. 2)

Contents of a process by which the printer 10 establishes a normal AP connection with the AP 200 will now be described with reference to FIG. 2. In the present embodiment, a situation is assumed in which a user has newly purchased the printer 10 and the user is to establish a normal AP connection between the printer 10 and the AP 200 which has been already installed in a residence, a workplace, or the like. It should be noted that, hereinbelow, in descriptions of processes performed by the CPUs 32 and 132 of the devices 10 and 100 in accordance with the programs 36 and 136 to 140, the CPUs will not be described as a subject, but the devices (in other words, the printer 10 and the portable terminal 100) will be described as a subject.

In T10, the user turns on the power of the printer 10. In this case, in T12, the printer 10 activates a SoftAP, and forms a SoftAPNW which is identified by the SSID "softap" as well as by a BSSID (abbreviation of Basic Service Set Identifier) "mac_x (in other words, the first MAC address)". Since the SoftAP is automatically activated in response to the power of the printer 10 being turned on, the user need not perform an operation for activating the SoftAP after performing the power ON operation, and thus user convenience is improved. It should be noted that, although the printer 10 automatically activates the SoftAP (T12) when power is turned on for the first time after the shipment of the printer 10, the printer 10 may not automatically activate the SoftAP when the power is turned on after a normal AP connection has been established with the AP 200 (in other words, alter the normal AP information AI has been stored in the memory 34).

For example, when the user desires the printer 10 to participate in a normal APNW, in T20, an operation for activating the setting application 140 is performed on the portable terminal 100. Accordingly, the following processes are realized by the setting application 140. In T22, the portable terminal 100 acquires the SoftAP information SI (in other words, the SSID "softap" and the password "pass_soft") described in advance in the setting application 140 in the memory 134, and sends a Probe request including the SSID "softap" in the acquired SoftAP information SI as an SSID of a transmission destination to the printer 10 via the Wi-Fi I/F 116. The Probe request is a command for requesting the printer 10 to participate in the normal APNW.

In response to receiving the Probe request including the SSID "softap" via the Wi-Fi I/F 16 in T22, the printer 10 sends a Probe response to the portable terminal 100 via the Wi-Fi I/F 16 in T24.

In T26, the printer 10 performs communications of various signals (for example, an Authentication signal, an Association signal, and a 4-way handshake) with the portable terminal 100 via the Wi-Fi I/F 16. In the course of the various communications described above, the printer 10 receives the password "pass_soft" included in the SoftAP information SI from the portable terminal 100, and performs an authentication of the password. Since the authentication of the password succeeds, the printer 10 establishes a SoftAP connection with the portable terminal 100. Accordingly, the printer 10 can cause the portable terminal 100 to participate in the SoftAPNW as a child station.

From the perspective of the portable terminal 100, in T24, the portable terminal 100 receives the Probe response from the printer 10 via the Wi-Fi I/F 116, and in T26, performs the communications of the various signals with the printer 10 via the Wi-Fi I/F 116. Accordingly, the portable terminal 100 establishes the SoftAP connection with the printer 10, and participates in the SoftAPNW as a child station.

In T28, using the SoftAPNW, the portable terminal 100 sends the normal AP information AI in the memory 134 to the printer 10 via the Wi-Fi I/F 116.

In response to receiving the normal AP information AI from the portable terminal 100 via the Wi-Fi I/F 116 using the SoftAPNW in T28, the printer 10 sends, to the AP 200 via the Wi-Fi I/F 16 in T30, a Probe request including the SSID "normal_ap" in the received normal AP information AI as an SSID of a transmission destination and also including the second MAC address "mac_y" as a MAC address of a transmission source. Subsequently, in T32, the printer 10 receives a Probe response from the AP 200.

In T34, the printer 10 performs communications of various signals (for example, an Authentication signal, an Association signal, and a 4-way handshake) with the AP 200. Also in the course of the various communications described above, the printer 10 sends a signal including the second MAC address "mac_y" as the MAC address of the transmission source to the AP 200. In the course of the various communications described above, the printer 10 further sends the password "pass_normal" included in the normal AP information AI received in T28 to the AP 200. Since an authentication of the password succeeds at the AP 200, the printer 10 establishes a normal AP connection with the AP 200. Accordingly, the printer 10 can participate in the normal APNW as a child station. As a result, the printer 10 can perform various communications with another device (for example, the portable terminal 100) via the AP 200.

In T36, the printer 10 stops the SoftAP and causes the SoftAPNW to disappear. Accordingly, the SoftAP connection established in T26 is disconnected.

(Process by which Printer 10 Establishes WFD Connection: FIG. 3)

Next, contents of a process by which the printer 10 establishes a WFD connection with the portable terminal 100 in a situation where the SoftAP is activated on the printer 10 will now be described with reference to FIG. 3. In FIG. 3, bold-line arrows and fine-line arrows between the printer 10 and the portable terminal 100 respectively denote wireless communications according to the NFC scheme and wireless communications according to the Wi-Fi scheme. T100 and T102 are respectively same as T10 and T12 shown in FIG. 2.

A case A where the print application 138 is activated on the portable terminal 100 will be described. For example, when the user desires the printer 10 to perform printing, in T120A, an operation for activating the print application 138 is performed on the portable terminal 100. Accordingly, the following processes except T124A to T128A (for example, T130A and T150) are realized by the print application 138. It should be noted that a communication with the printer 10 via the Wi-Fi I/F 116 such as T130A is realized by the print application 138 appropriately supplying instructions to the OS program 136.

In T122A, the user brings the portable terminal 100 close to the printer 10. Accordingly, a distance between the NFC I/F 112 of the portable terminal 100 and the NFC I/F 12 of the printer 10 becomes equal to or shorter than the distance (for example, 10 cm) with which a wireless communication according to the NFC scheme can be performed, and in T124A, an NFC wireless link is established between the portable terminal 100 and the printer 10. It should be noted that the processes of T124A and subsequent T126A to T128A are realized not by the print application 138 supplying instructions to the OS program 136, but by the OS program 136 and the NFC I/F 112 operating in accordance with rules determined in advance.

In T126A, using the NFC wireless link established in T124A, the portable terminal 100 sends a Read request to the printer 10 via the NFC I/F 112. The Read request is a request for reading (in other words, receiving) information stored in the memory 14 of the NFC I/F 12 of the printer 10.

In response to receiving the Read request from the portable terminal 100 in T126A, in T128A, the NFC I/F 12 of the printer 10 sends the first MAC address "mac_x" in the memory 14 to the portable terminal 100 using the NFC wireless link established in T124A. Accordingly, the printer 10 can notify the portable terminal 100 of the first MAC address "mac_x" as a MAC address for identifying the printer 10 itself.

In T128A, the NFC I/F 112 of the portable terminal 100 receives the first MAC address "mac_x" from the printer 10 using the NFC wireless link established in T124A. In response thereto, in T130A, the portable terminal 100 sends a Probe request including the received first MAC address "mac_x" as the MAC address of the transmission destination to the printer 10 via the Wi-Fi I/F 116. The Probe request is a command for requesting the printer 10 to participate in a WFDNW in which the portable terminal 100 operates as a parent station (in other words, as a G/O).

A case B where the print application 138 is not activated on the portable terminal 100 will now be described. In the present case, the operation for activating the print application 138 is not performed on the portable terminal 100. For example, in a situation where an application that is different from the print application 138 is activated, an NFC wireless link may be established between the portable terminal 100 and the printer 10 even without activating the print application 138. T122B to T128B are same as T122A to T128A in the case A. In the present case, since the print application 138 is not activated, even if the portable terminal 100 acquires the first MAC address "mac_x" in T128B, the portable terminal 100 does not send the Probe request including the first MAC address "mac_x" to the printer 10.

In T140, in response to the NFC wireless link being established, the printer 10 determines whether or not the Probe request including the first MAC address "mac_x" as the MAC address of the transmission destination is received via the Wi-Fi I/F 16 (in other words, the printer 10 monitors that the Probe request is received). In the aforementioned case A in which the Probe request including the first MAC address "mac_x" is received, the printer 10 determines YES in T140, and performs the processes of T142 and thereafter. On the other hand, in the aforementioned case B in which the Probe request including the first MAC address "mac_x" is not received, the printer 10 determines NO in T140, and skips the processes of T142 and thereafter. Accordingly, the printer 10 continues to operate as the SoftAP, and maintains the state where the SoftAPNW is formed. As a result, the printer 10 can appropriately achieve the purpose of acquiring the normal AP information AI for participating in the normal APNW from the portable terminal 100 (refer to FIG. 2).

In the case where the printer 10 determines that the Probe request including the first MAC address "mac_x" has been received (YES in T140), the printer 10 stops the SoftAP in T142, and causes the SoftAPNW to disappear. Accordingly, a state of the printer 10 shifts from a SoftAP state where the printer 10 operates as the SoftAP to a specific state where the printer 10 does not operate as a SoftAP. In other words, the Probe request received in T130A is a signal for causing the state of the printer 10 to shift from the state where the printer 10 operates as the parent station (in other words, as the SoftAP) of the SoftAPNW to the specific state. As described above, in the present embodiment, the Wi-Fi I/F 16 is incapable of operating as a child station of the WFD scheme while operating as a SoftAP. Since the printer 10 needs to participate in a WFDNW as a child station in the process of T180 (to be described later), the printer 10 stops the SoftAP in T142. It should be noted that the printer 10 may stop the SoftAP in T142 even when the Wi-Fi I/F 16 is capable of simultaneously performing a wireless communication according to the SoftAP scheme and a wireless communication according to the WFD scheme.

In T144, the printer 10 sends a Probe response to the portable terminal 100 via the Wi-Fi I/F 16. It should be noted that the process of T144 need only be performed after T130A, and may be performed before T140, or may be performed after T140 and before T142.

In T150, the portable terminal 100 activates a G/O of the WFD scheme and forms a WFDNW that is identified by the SSID "wfdgo". Accordingly, the state of the portable terminal 100 shifts from a non-parent station state where the portable terminal 100 does not operate as a parent station of a wireless network to a G/O state where the portable terminal 100 operates as a parent station of the WFDNW identified by the SSID "wfdgo".

In the present embodiment, the portable terminal 100 activates the G/O in T150 after having sent the Probe request including the first MAC address "mac_x" to the printer 10 in T130A, and having received the Probe response from the printer 10 in T144. In other words, the portable terminal 100 can activate the G/O after having confirmed that a WFD connection with the printer 10 can be established. Therefore, the portable terminal 100 can prevent the activation of the G/O in a situation where a WFD connection with the printer 10 cannot be established, and as a result, a processing load on the portable terminal 100 is reduced.

In T152, the portable terminal 100 sends, to the printer 10 via the Wi-Fi I/F 116, an Invitation request which includes the first MAC address "mac_x" as the MAC address of the transmission destination and also includes the SSID "wfdgo" as an SSID of the transmission source. The Invitation request is a command for requesting the printer 10 to participate in the WFDNW.

When the printer 10 receives the Invitation request from the portable terminal 100 via the Wi-Fi I/F 16 in T152, the printer 10 determines that the first MAC address "mac_x" of the printer 10 itself is included in the Invitation request, and in T154, sends an invitation response to the portable terminal 100 via the Wi-Fi I/F 16. The Invitation response includes the first MAC address "mac_x" as the MAC address of the transmission source.

In response to receiving the Invitation response from the printer 10 via the Wi-Fi I/F 116 in T154, the portable terminal 100 performs a WPS communication according to the WPS with the printer 10 via the Wi-Fi I/F 116 in T160. In doing so, the portable terminal 100 sends the password "pass_wfd" included in the WFD information WI described in advance in the print application 138 to the printer 10.

In T180, the portable terminal 100 performs communications of various signals (for example, an Authentication signal, an Association signal, and a 4-way handshake) with the printer 10. In the course of the various communications described above, the portable terminal 100 receives the password "pass_wfd" from the printer 10. Since the authentication of the password succeeds at the portable terminal 100, the portable terminal 100 establishes a WFD connection with the printer 10. Accordingly, the portable terminal 100 can cause the printer 10 to participate in the WFDNW as a child station.

From the perspective of the printer 10, in response to performing the WPS communication with the portable terminal 100 via the Wi-Fi I/F 16 in T160, the printer 10 shifts to a client state of the WFD scheme from the specific state in T162. Then, in T180, the printer 10 performs the communications of the various signals with the portable terminal 100 via the Wi-Fi I/F 16. Also in the course of the various communications described above, the printer 10 sends a signal including the first MAC address "mac_x" as the MAC address of the transmission source to the portable terminal 100. Accordingly, the printer 10 establishes the WFD connection with the portable terminal 100, and participates, as a child station (in other words, as a client), in the WFDNW in which the portable terminal 100 operates as the parent station (in other words, as the G/O).

When an operation of selecting an image of a print target is performed on the portable terminal 100, in T184, the printer 10 receives, using the WFDNW, a print performing request including image data representing the image from the portable terminal 100 via the Wi-Fi I/F 16. The print performing request is a request for causing the printer 10 to perform printing. In T186, the printer 10 performs printing of the image represented by the image data. Accordingly, the purpose of performing printing by receiving the print performing request from the portable terminal 100 is achieved.

After the communication of the print performing request has completed, the printer 10 sends a disconnecting request for disconnecting the WFD connection to the portable terminal 100 via the Wi-Fi I/F 16. Accordingly, in T188, the WFD connection in T180 is disconnected, and the state of the printer 10 shifts from the client state to a device state. The device state is a state where the printer 10 does not belong to a wireless network according to the WFD scheme as a parent station or as a child station.

In T190, the printer 10 again forms the SoftAPNW that is identified by the SSID "softap" by activating the SoftAP. Accordingly, the printer 10 shifts from the state where the printer 10 does not belong to a wireless network (in other words, the device state) to the SoftAP state where the printer 10 operates as the SoftAP. In other words, the printer 10 shifts to the SoftAP state after the communication of the print performing request has completed. Therefore, after the purpose of performing printing by receiving the print performing request from the portable terminal 100 has been achieved, the printer 10 can appropriately achieve the purpose of acquiring the normal AP information AI for participating in the normal APNW from the portable terminal 100 (refer to FIG. 2).

Effect of Present Embodiment

A configuration of a comparative embodiment will be described before describing an effect of the present embodiment. While activating a SoftAP in order to achieve a purpose of acquiring normal AP information for participating in a normal APNW, a printer according to the comparative embodiment establishes a SoftAP connection with a portable terminal, and causes the portable terminal to participate in a SoftAPNW as a child station. Subsequently, using the SoftAPNW, the printer receives a print performing request from the portable terminal. However, in the configuration of the comparative embodiment, the printer monitors the reception of the normal AP information using the SoftAPNW in order to achieve the first purpose of acquiring the normal AP information, and thus even when the printer receives the print performing request using the SoftAPNW, the printer does not perform printing in accordance with the request. In other words, the printer cannot appropriately achieve the second purpose of the portable terminal causing the printer to perform printing.

In contrast, in the present embodiment, as shown in FIG. 3, the printer 10 operates as the SoftAP (T102 in FIG. 3) in order to achieve the first purpose of acquiring the normal AP information AI. In addition, in response to the NFC wireless link being established between the printer 10 and the portable terminal 100 (T124A) in order to achieve the second purpose of the portable terminal 100 causing the printer 10 to perform printing when the printer 10 operates as the SoftAP, the printer 10 receives the Probe request including the first MAC address "mac_x" from the portable terminal 100 via the Wi-Fi I/F 16 (T130A). In this case, the printer 10 shifts from the state where the printer 10 operates as the parent station of the SoftAPNW for the first purpose to the specific state where the printer 10 does not operate as the parent station of the SoftAPNW (T142), and the printer 10 participates, as a child station, in the WFDNW in which the portable terminal 100 operates as the parent station (T180).

In other words, instead of causing the portable terminal 100 to participate in the SoftAPNW for the first purpose as a child station, the printer 10 can participate in the WFDNW for the second purpose as a child station. As a result, using the WFDNW, the printer 10 can appropriately achieve the second purpose in accordance with the desire of the portable terminal 100. In particular, in the present embodiment, when the Probe request including the first MAC address "mac_x" is not received from the portable terminal 100 (NO in T140) despite the NFC wireless link having been established with the portable terminal 100, the state of the printer 10 is maintained in the state where the printer 10 operates as the parent station of the SoftAPNW. Therefore, when the Probe request including the first MAC address "mac_x" is not received from the portable terminal 100, the printer 10 can appropriately maintain the state where the SoftAPNW for the first purpose is formed.

In addition, in response to the NFC wireless link being established (T124A) while the printer 10 is operating as the SoftAP for the first purpose, the portable terminal 100 sends the Probe request including the first MAC address "mac_x" to the printer 10 via the Wi-Fi I/F 116 (T130A), in order to achieve the second purpose. Accordingly, the state of the printer 10 shifts from the state where the printer 10 operates as the SoftAP for the first purpose to the specific state where the printer 10 does not operate as the parent station of the SoftAPNW. As a result, instead of participating in the SoftAPNW for the first purpose as a child station, the portable terminal 100 can operate as the parent station of the WFDNW for the second purpose (T150), and cause the printer 10 to participate in the WFDNW as a child station (T180). Therefore, using the WFDNW, the portable terminal 100 can appropriately achieve the second purpose.

(Correspondence Relationships)

The printer 10 and the portable terminal 100 are, respectively, examples of the "communication device" and the "terminal device". The NFC I/F 12 (or 112) and the Wi-Fi I/F 16 (or 116) are, respectively, examples of the "first wireless interface" and the "second wireless interface". The NFC wireless link of T124A in FIG. 3 and the Probe request including the first MAC address "mac_x" are, respectively, examples of the "wireless link" and the "predetermined signal". The SoftAP state of operating as a parent station, of a SoftAPNW and the SoftAPNW are, respectively, examples of the "parent station state (or the first parent station state)" and the "first wireless network". The G/O state, the WFDNW, and the WFD connection in T180 in FIG. 3 are, respectively, examples of the "second parent station state", the "second wireless network", and the "first wireless connection". The client state is an example of the "child station state". The image data is an example of the "target data". The SoftAP connection in T26 in FIG. 2, the normal AP information AI, the normal AP connection in T34 in FIG. 2, and the normal APNW are, respectively, examples of the "second wireless connection", the "wireless setting information", the "third wireless connection", and the "third wireless network". The print application 138 and the setting application 140 are examples of the "non-transitory computer-readable medium storing computer-readable instructions".

(First Modification)

The memory 34 of the printer 10 may store the SSID "wfdgo" of the WFDNW in advance. In addition, the memory 14 of the NFC I/P 12 may not store the first MAC address "mac_x". In this case, when the NFC wireless link is established in T124A in FIG. 3, the portable terminal 100 may send a Probe request including the SSID "wfdgo" to the printer 10 in T130A without performing T126A and T128A. The printer 10 determines in T140 whether or not the Probe request including the SSID "wfdgo" is received, and in a case of determining YES, the printer 10 stops the SoftAP in T142. Subsequently, the printer 10 sends the Probe request including the SSID "wfdgo" to the portable terminal 100 without performing T144. Accordingly, the portable terminal 100 activates the G/O in T150, and sends a Probe response to the printer 10 without performing T152 and T154. Subsequently, T160 to T190 are performed. In the present modification, the Probe request including the SSID "wfdgo" is an example of the "predetermined signal".

(Second Modification)

The printer 10 may stop the SoftAP after having received the Invitation request including the first MAC address "mac_x" from the portable terminal 100, in other words, after the process of T152 has been performed. In the present modification, the Invitation request including the first MAC address "mac_x" is an example of the "predetermined signal".

(Third Modification)

In T12 shown in FIG. 2, the printer 10 may activate a G/O of the WFD scheme instead of activating the SoftAP, and form a WFDNW. In addition, the printer 10 may establish a WFD connection with the portable terminal 100 in T26 shown in FIG. 2, and using the WFDNW, may receive the normal AP information AI from the portable terminal 100 in T28. Generally speaking, the "parent station state (or the first parent station state)" may not be a state in which a SoftAP is activated, and may be a state in which a G/O is activated.

(Fourth Modification)

Instead of activating the WFD in T150 shown in FIG. 3, the portable terminal 100 may activate a SoftAP and form a SoftAPNW. In addition, the portable terminal 100 may establish a SoftAP connection with the printer 10 in T180, and send the print performing request to the printer 10 using the SoftAPNW in T184. Generally speaking, the "second parent station state" may not be a state in which a G/O is activated, and may be a state in which a SoftAP is activated.

(Fifth Modification)

In T180, the printer 10 may establish a WFD connection with the portable terminal 100 using the second MAC address "mac_y" as a MAC address of the printer 10 itself. In other words, the MAC address used for the normal AP connection of T34 shown in FIG. 2 and the MAC address used for the WFD connection of T180 may be the same. Generally speaking, the "first wireless connection" may be established using the "second MAC address".

(Sixth Modification)

The process of T190 shown in FIG. 3 may not be performed. In the present modification, the "shift the state of the communication device to the parent station state from a child station state" can be omitted.

(Seventh Modification)

In the embodiment described above, the SoftAPNW is used to achieve the purpose of the printer 10 acquiring the normal AP information. Instead, the SoftAPNW may be used to achieve a purpose of the printer 10 acquiring a setting value, a purpose of the printer 10 acquiring an update file for updating the program 36, and the like, in the present modification, the "receive wireless setting information" and the "establish a third wireless connection" can be omitted.

(Eighth Modification)

The "communication device" may not be a printer, and may be, for example, a scanner, a multifunctional device, a server, or a PC. For example, in the case where the communication device is a scanner, when receiving a scan request from the portable terminal 100 in T184 in FIG. 3, the communication device may perform scanning of a target document and send scan data representing the target document to the portable terminal 100 in T186. In the present modification, the scan data is an example of the "target data".

(Ninth Modification)

The "first wireless interface" may not be an NFC I/F, and may be, for example, a BT (abbreviation of Bluetooth (registered trademark)) interface capable of performing a BT communication.

(Tenth Modification)

In the embodiment described above, the processes shown in FIGS. 2 and 3 are realized by the CPU 32 of the printer 10 performing the program 36 (in other words, software) and the CPU 132 of the portable terminal 100 performing the programs 136, 138, and 140. Alternatively, any of the processes may be realized by hardware such as a logic circuit.

What is claimed is:

1. A communication device comprising:
a first wireless interface;
a second wireless interface being different from the first wireless interface;
a processor; and
a memory configured to store computer-readable instructions therein, the computer-readable instructions, when executed by the processor, causing the communication device to:
in response to a wireless link via the first wireless interface being established with a terminal device while a state of the communication device is a parent station state where the communication device operates as a parent station of a first wireless network, receive a predetermined signal from the terminal device via the second wireless interface, the first wireless network being a network for performing a wireless communication via the second wireless interface;
in a case where the predetermined signal is received from the terminal device, shift the state of the communication device from the parent station state to a specific state where the communication device does not operate as the parent station of the first wireless network, wherein the state of the communication device is maintained in the parent station state in a case where the predetermined signal is not received from the terminal device even if the wireless link via the first wireless interface has been established with the terminal device while the state of the communication device is the parent station state; and
after the state of the communication device has been shifted from the parent station state to the specific state, establish a first wireless connection via the second wireless interface with the terminal device so as to participate in a second wireless network as a child station, the second wireless network being a wireless network in which the terminal device operates as a parent station.

2. The communication device as in claim 1, wherein the first wireless interface is an interface for performing a wireless communication according to an NFC (abbreviation of Near Field Communication) scheme.

3. The communication device as in claim 1, wherein
a first MAC address is assigned to the second wireless interface,
the first wireless network is identified by the first MAC address,
the first wireless interface is configured to send the first MAC address to the terminal device via the wireless link,
the predetermined signal includes the first MAC address, and
the first wireless connection is established by using the first MAC address as a MAC address of the communication device.

4. The communication device as in claim 1, wherein the computer-readable instructions, when executed by the processor, further cause the communication device to:
after the communication device has participated in the second wireless network as the child station, perform a wireless communication of target data with the terminal device via the second wireless interface by using the second wireless network; and
after the wireless communication of the target data has been completed, shift the state of the communication device from a child station state to the parent station state, the child station state being a state where the communication device operates as the child station of the second wireless network.

5. The communication device as in claim 1, wherein
the first wireless network is a wireless network according to a SoftAP (abbreviation of Software Access Point) scheme; and
the second wireless network is a wireless network according to a WFD (abbreviation of Wi-Fi Direct (registered mark)) scheme.

6. The communication device as in claim 1, wherein the computer-readable instructions, when executed by the processor, further cause the communication device to:
while the state of the communication device is the parent station state, establish a second wireless connection via the second wireless interface with the terminal device so as to cause the terminal device to participate in the first wireless network as a child station;
after the terminal device has participated in the first wireless network as the child station, receive wireless setting information from the terminal device via the second wireless interface by using the first wireless network, the wireless setting information being information for participating in a third wireless network as a child station, the third wireless network being a wireless network in which an access point operates as a parent station, the access point being different from the communication device and the terminal device; and
establish a third wireless connection via the second wireless interface with the access point by using the wireless setting information so as to participate in the third wireless network as the child station.

7. The communication device as in claim 6, wherein
a first MAC address and a second MAC address are assigned to the second wireless interface,
the first wireless network is identified by the first MAC address,
the first wireless connection is established by using the first MAC address as a MAC address of the communication device, and
the third wireless connection is established by using the second MAC address as a MAC address of the communication device.

8. A non-transitory computer-readable medium storing computer-readable instructions for a terminal device, the computer-readable instructions, when executed by a processor of the terminal device, causing the terminal device to;

in response to a wireless link via a first wireless interface of the terminal device being established with a communication device while a state of the communication device is a first parent station state where the communication device operates as a parent station of a first wireless network, send a predetermined signal to the communication device via a second wireless interface of the terminal device, the predetermined signal being for shifting the state of the communication device from the first parent station state to a specific state where the communication device does not operate as the parent station of the first wireless network;

shift a state of the terminal device from a non-parent station state to a second parent station state, the non-parent station state being a state where the terminal device does not operate as a parent station of a wireless network, the second parent station state being a state where the terminal device operates as a parent station of a second wireless network, the second wireless network being a network for performing a wireless communication via the second wireless interface; and after the state of the communication device has been shifted from the first parent station state to the specific state, establish a first wireless connection via the second wireless interface with the communication device so as to cause the communication device to participate in the second wireless network as a child station.

9. The non-transitory computer-readable medium as in claim 8, wherein the state of the terminal device is shifted from the non-parent station state to the second parent station state after the predetermined signal has been sent to the communication device.

10. The non-transitory computer-readable medium as in claim 8, wherein the first wireless interface is an interface for performing a wireless communication according to an NFC (abbreviation of Near Field Communication) scheme.

11. The non-transitory computer-readable medium as in claim 8, wherein
the first wireless network is a wireless network according to a SoftAP (abbreviation of Software Access Point) scheme; and
the second wireless network is a wireless network according to a WFD (abbreviation of Wi-Fi Direct (registered mark)) scheme.

12. The non-transitory computer-readable medium as in claim 8, wherein the computer-readable instructions, when executed by the processor of the terminal device, further cause the terminal device to:

while the state of the communication device is the first parent station state, establish a second wireless connection via the second wireless interface with the communication device so as to participate in the first wireless network as a child station; and send wireless setting information to the communication device via the second wireless interface by using the first wireless network, the wireless setting information being information for participating in a third wireless network as a child station, the third wireless network being a wireless network in which an access point operates as a parent station, the access point being different from the communication device and the terminal device.

13. A terminal device comprising:
a first wireless interface;
a second wireless interface;
a processor; and
a memory configured to store computer-readable instructions therein, the computer-readable instructions, when executed by the processor, causing the terminal device to:

in response to a wireless link via the first wireless interface being established with a communication device while a state of the communication device is a first parent station state where the communication device operates as a parent station of a first wireless network, send a predetermined signal to the communication device via the second wireless interface, the predetermined signal being for shifting the state of the communication device from the first parent station state to a specific state where the communication device does not operate as the parent station of the first wireless network;

shift a state of the terminal device from a non-parent station state to a second parent station state, the non-parent station state being a state where the terminal device does not operate as a parent station of a wireless network, the second parent station state being a state where the terminal device operates as a parent station of a second wireless network, the second wireless network being a network for performing a wireless communication via the second wireless interface; and after the state of the communication device has been shifted from the first parent station state to the specific state, establish a first wireless connection via the second wireless interface with the communication device so as to cause the communication device to participate in the second wireless network as a child station.

14. The terminal device as in claim 13, wherein the state of the terminal device is shifted from the non-parent station state to the second parent station state after the predetermined signal has been sent to the communication device.

15. The terminal device as in claim 13, wherein the first wireless interface is an interface for performing a wireless communication according to an NFC (abbreviation of Near Field Communication) scheme.

16. The terminal device as in claim 13, wherein
the first wireless network is a wireless network according to a SoftAP (abbreviation of Software Access Point) scheme; and
the second wireless network is a wireless network according to a WFD (abbreviation of Wi-Fi Direct (registered mark)) scheme.

17. The terminal device as in claim 13, wherein the computer-readable instructions, when executed by the processor, further cause the terminal device to:

while the state of the communication device is the first parent station state, establish a second wireless connection via the second wireless interface with the communication device so as to participate in the first wireless network as a child station; and send wireless setting information to the communication device via the second wireless interface by using the first wireless network, the wireless setting information being information for participating in a third wireless network as a child station, the third wireless network being a wireless network in which an access point operates as a parent station, the access point being different from the communication device and the terminal device.

\* \* \* \* \*